US010710783B2

(12) United States Patent
West

(10) Patent No.: US 10,710,783 B2
(45) Date of Patent: Jul. 14, 2020

(54) REUSABLE ROTATING BOTTLE CAP MARKERS FOR BOTTLES AND CONTAINERS

(71) Applicant: Rennie West, Carson, CA (US)

(72) Inventor: Rennie West, Carson, CA (US)

(*) Notice: Subject to any disclaimer, the term of this patent is extended or adjusted under 35 U.S.C. 154(b) by 66 days.

(21) Appl. No.: 15/900,986

(22) Filed: Feb. 21, 2018

(65) Prior Publication Data
US 2018/0178955 A1 Jun. 28, 2018

Related U.S. Application Data

(63) Continuation-in-part of application No. 14/302,929, filed on Jun. 12, 2014, now Pat. No. 9,934,707.

(60) Provisional application No. 61/837,484, filed on Jun. 20, 2013.

(51) Int. Cl.
B65D 51/24 (2006.01)
G09F 3/02 (2006.01)

(52) U.S. Cl.
CPC .... B65D 51/245 (2013.01); G09F 2003/0273 (2013.01); Y02W 30/807 (2015.05)

(58) Field of Classification Search
CPC ........ G06Q 10/10; G09F 11/02; B65D 51/245
See application file for complete search history.

(56) References Cited

U.S. PATENT DOCUMENTS

| 3,313,441 A * | 4/1967 | Fadden | B65D 47/265 206/534 |
| 3,407,954 A * | 10/1968 | Millis | B65D 55/145 215/206 |
| 3,445,021 A * | 5/1969 | Johnson | B65D 55/145 215/206 |
| 3,684,117 A | 8/1972 | Leopoldi et al. | |
| 3,850,324 A | 11/1974 | Meyer | |
| 4,941,573 A | 7/1990 | Fuerstman | |
| 6,615,517 B2 | 9/2003 | King | |
| 7,661,384 B2 * | 2/2010 | Mataya | A61J 7/04 116/307 |
| 8,028,446 B2 | 10/2011 | Moran | |
| 8,056,930 B2 | 11/2011 | Cassidy | |
| 2006/0180566 A1 | 8/2006 | Mataya | |
| 2006/0207958 A1 * | 9/2006 | Hamer | B65D 55/145 215/206 |
| 2012/0138563 A1 | 6/2012 | Brumfield | |
| 2012/0241451 A1 | 9/2012 | Pether et al. | |

(Continued)

Primary Examiner — Shawn M Braden
(74) Attorney, Agent, or Firm — Argus Intellectual Enterprise; Jordan Sworen; Daniel Enea

(57) ABSTRACT

Provided is a reusable container cap adapted to help identify a container belonging to a particular user or to help identify contents of a container when there are several containers similar in appearance. The cap comprises a cap housing that encases one or more rotating dials. The dials are stacked inside of the cap housing, forming a flat upper surface. A visible surface of each of the dials features letters, numbers, or symbols near its outer edge. The cap housing has a cutout that allows the user to rotate the dials using his or her fingers. When the dials are rotated, a combination of letters, numbers, or symbols are displayed, enabling the user identify his or her bottle or contents within the bottle. The present invention fits over standard size valves of various conventional bottles and containers.

13 Claims, 7 Drawing Sheets

(56) References Cited

U.S. PATENT DOCUMENTS

| | | |
|---|---|---|
| 2013/0036634 A1 | 2/2013 | Key |
| 2014/0008319 A1* | 1/2014 | Buxton-Dakides ....... A61J 1/03 215/230 |

* cited by examiner

REUSABLE ROTATING BOTTLE CAP MARKERS FOR BOTTLES AND CONTAINERS

CROSS REFERENCE TO RELATED APPLICATION

This application claims the benefit of U.S. Provisional Application No. 61/837,484 filed on Jun. 20, 2013 and U.S. Nonprovisional application Ser. No. 14/302,929. The above identified patent application is herein incorporated by reference in its entirety to provide continuity of disclosure.

BACKGROUND OF THE INVENTION

The present invention relates to a reusable bottle cap adapted for identifying the owner or contents of a bottle or a container. More specifically, the present invention describes a bottle cap with one or more dials that help individuals identify their beverage bottle. The dials feature various characters such as letters, numbers, or symbols that are displayed through a window cutout on top or side of the cap. A user can turn the dials to display a particular combinations of letters, numbers, or symbols. The bottle cap is designed to fit a valve or an opening for a standard size beverage bottle, thereby allowing users to use the present invention with a wide variety of beverage bottles or containers. The bottle cap helps distinguish a beverage bottle from another beverage bottle similar in appearance, which prevents confusion and spread of germs.

Many individuals drink water, soft drinks, and other beverages from disposable plastic bottles. Disposable plastic beverage bottles tend to be similar in appearance to other disposable plastic bottles. Particularly when individuals are drinking the same beverage in a social gathering, it is often impossible to distinguish one bottle from the other. When individuals put their drinks down and cannot remember which bottle is theirs, half-consumed drinks are often tossed out to avoid unintentionally drinking another person's drink. In an effort to identify their beverage bottle, some individuals attempt to label their bottles with markers, but marker ink can be quickly wiped off by the condensation that forms on the bottle's surface. Other individuals choose to rip off the beverage's label in hopes of identifying their bottles, but this does not work if multiple individuals remove the label. Similar bottle appearances often cause individuals to inadvertently drink from the wrong bottle, which can lead to spread of bacteria and germs.

The present invention is a bottle cap designed to assist individuals in identifying their beverage bottles, without the need to mark the bottle or alter the appearance of the bottle label. Individuals can use the present invention to display his or her initials or a particular combination of letters, numbers, or symbols, which is easy to read. Once a user adjusts the dials of the present invention to display the desired combination of letters, numbers, or symbols, the user can lock the combination in place by using a locking mechanism on the device. The locking mechanism on the device prevents the user from accidentally rotating the dials and changing the combination of letters, numbers, or symbols. The locking mechanism can be easily unlocked when the user is ready to change the combination of letters, numbers, or symbols.

The present invention helps to prevent individuals from unintentionally drinking out of the wrong beverage bottle by helping the user to easily identify his or her bottle. Additionally, the present invention can be used to identify the contents in a bottle or container. For instance, a user having a special dietary restrictions or allergies can utilize the present invention to display identifying information about contents of the bottle to avoid inadvertently consuming the contents. The present invention is reusable and may be used with various types of beverage bottles having a standard size valve, allowing users to use the bottle cap with a different beverage bottle. Further, the present invention can help prevent individuals from transmitting germs or from drinking out of a beverage bottle containing liquids that could cause hypersensitive reactions to certain individuals.

Patents have been granted to several devices that attempt to facilitate the identification of beverage bottles of the owner, and further to those emphasizing versatile use with various types of beverage bottles. Many bottle caps require a user to make markings on a cap or remember a designed marking on a bottle or a container. These devices, however, fail to provide a reusable bottle cap device adapted to be positioned on a bottle having a standard size valve, and that further includes letters, numbers, or symbols disposed on one or more dials, which improves the identification of beverage bottles similar in appearance. In further comparison to the prior art, the present invention does not require a user to make a marking with a writing utensil or remember a designated code or design on a bottle thereby providing more convenience in a solution that improves the identification of beverage bottles similar in appearance. Thus, the present invention addresses the prominent shortcomings relating to bottle caps that commonly reside in the art and provides a novel solution relating to identifying one bottle from another.

Specifically, U.S. Publication Patent Application Number 2012/0138563 to Brumfield discloses an identifiable cap for a beverage container. The Brumfield device features a small region on top of the cap that has a small writable surface. Unlike the present invention, the Brumfield device requires a user to mark the cap with a writing utensil to identify his or her beverage container. While the writable surface on the cap allows the user to identify his or her beverage container, the Brumfield device is limited to use with a writing utensil, which can be problematic and inconvenient. The marking can also be rubbed off of the cap, unless a cover or a film is used to protect the marked surface. In contrast, the present invention is capable of allowing the user to mark his or her beverage without a writing utensil. Additionally, the Brumfield device includes identifying tags with pre-stamped symbols. However, the tags would not help distinguish one bottle from another if multiple individuals used the same tag. On the other hand, the present invention allows a user to display one of hundreds of combinations of letters, numbers, or symbols, significantly reducing the possibility of multiple individuals displaying the same combination of letters, numbers, or symbols. Furthermore, the present invention comprises a locking mechanism that allows the user to lock the combination until the user is ready to change it. As such, the user cannot inadvertently change the combination of letters, numbers, or symbols while using the present invention.

Similarly, U.S. Pat. No. 8,056,930 to Cassidy discloses a bottle cap for identifying beverages. The Cassidy device includes layers of coating on the top and sides of a bottle cap and a ring attached thereto. The Cassidy device requires a user to scratch random marks on the cap, exposing a layer of different color underneath. The alignment of the marking with respect to the cap and the ring allows the user to identify his or her bottle. While the Cassidy device can provide a unique marking for an individual user, its use is very limited. Specifically, the user can scratch off the entire layer of coating during single use, or inadvertently make a marking while using the device. Unlike the present invention, the Cassidy device is suitable for a short-term use. As such, the purpose and design of the Cassidy device diverges in intent and design from the present invention, which discloses a plurality of dials that can clearly display a variety of combinations of letters, numbers, or symbols featured on its top surface. The present invention is suited for repeated use over time, and is not limited to short-term use. Further, in constrast to the Cassidy device, the present invention allows a user to change the displayed letters, numbers, or symbols as desired.

U.S. Published Patent Application Number 2013/0036634 to Key discloses a rotating label for various containers. The label disclosed in Key contains information that coordinates with information printed on an interior portion of a closure for the container. The label is adapted to be interactive with the closure particularly for beverage companies to promote contests and other information. Thus, the closure in Key has limited use without the label. While the closure in Key comprises information printed on an interior portion of the closure, it does not provide identifying information personal to the user. As such, the purpose and design of the Key device diverges in intent and design from the present information, which discloses a bottle cap displaying identifying information on a top surface thereof, and wherein the bottle cap is encases one or more dials that can be rotated by the user to display a particular combination of letters, numbers, or symbols. In addition, the present invention is suitable for use with various styles of beverage bottles so long as the valve of the beverage bottle is a standard size valve.

U.S. Pat. No. 8,028,446 to Moran discloses a collection of colored beverage caps adapted for conventional beverage bottles. A single color is designated to a single user to indicate a user of the beverage bottle. While the Moran device can easily identify multiple beverage bottles, the Moran device has limited use because only a set number of caps with different colors are available. Accordingly, the Moran device is not desirable when there are not enough colors for all of the users to have a different colored cap at one time. In contrast, the present invention does not limit the number of users that can use the device at any one time. The present invention is capable of displaying one of hundreds of different combination of letters, numbers, or symbols such that the possibility of any two users displaying a same combination of letters, numbers, or symbols is highly unlikely and easily preventable. Further, the present invention allows a user to change the identifying information displayed by rotating the dials on the bottle cap.

U.S. Published Patent Application 2012/0241451 to Pether discloses a cap adapted for pill bottles that indicate tamper evidence, comprising a lid, a liner, and a spring. The Pether device requires a user to push down on the lid before opening the bottle to prevent a tab from becoming damaged or punctured, which would indicate tempering. Unlike the present invention, the Pether device is not adapted to indicate which bottle belongs to which user. Rather, the Pether cap is adapted to identify any tampering with the bottle and its contents, which is evidenced by a damaged tab attached to the cap. In this respect, the objective and design of the Pether device differs from the objective and design of the present invention, which discloses a bottle cap for displaying identifying information to indicate which beverage bottle belongs to a particular user.

U.S. Pat. No. 4,941,573 to Fuerstman discloses an identification system for individual containers of a consumer pack of beverages. The Fuerstman device comprises identifying indicia, such as a code, printed onto the label of the container or directly onto the container. Although the identifying indicia in Fuerstman assists in distinguishing one container from another, the identifying indicia cannot be reused because it is unique to the particular container that it is attached to.

Furthermore, the Fuerstman device has limited use because labels can be easily torn off of the container, and printed materials can be easily wiped off by the condensation on the bottle surface. The present invention addresses the issue by displaying the identifying indicia on a reusable bottle cap, allowing users to display letters, numbers, or symbols of their choice.

While Brumfield, Cassidy, Key, Moran, and Fuerstman disclose an identification system for beverage bottles, U.S. Pat. No. 6,615,517 to King discloses an identification system for glassware. Specifically, the King device discloses a trinket attached to an annular member that clings onto a piece of glassware, where the color or design of the trinket assists users in distinguishing one glass from another. Unlike the present invention, the King device is primarily intended for use with reusable glassware having a stem or a handle, such as wine glasses, beer mugs, or cocktail glasses. The King device is not adapted for beverage bottles or containers, and fails to address the issues of identifying one beverage bottle from another that is similar in appearance. As such, applications of the King device will not be desirable for use in disposable or reusable beverage bottles in which differentiating bottles similar in appearance is a concern. It is unlikely that a user will cling a trinket to a beverage bottle. Rather, users will desire a bottle cap such as the present invention, which allows users to display identifying information on the cap of the beverage bottle.

The present invention relates to a beverage bottle cap adapted to display identifying information, allowing a user to easily identify his or her bottle. The bottle cap comprises one or more dials having letters, numbers, or symbols printed along the outer edge of its visible surface. The three dials are stacked on top of the other such that the third dial is at the bottom, the second dial is at the middle, and the first dial is at the top. The dials are enclosed in a bottle cap housing, which comprises at least one cutout on the top or the side of the housing. A user can access the edge of the dials through the cutout on the side of the housing and can turn the dials using his or her thumb or finger until a desired combination of letters, numbers, and symbols is displayed on the cap. The present invention can be used with a standard size valve on various beverage bottles. It is therefore submitted that the present invention substantially diverges in design elements from the prior art and consequently it is clear that there is a need in the art for an improvement to existing bottle cap devices that facilitate identification of the owner. In this regard the instant invention substantially fulfills these needs.

SUMMARY OF THE INVENTION

In view of the foregoing disadvantages inherent in the known types of bottle cap devices now present in the prior art, the present invention provides a new improvement to bottle caps wherein the same can be utilized to help identify a user and contents of a container when there are several containers similar in appearance.

It is therefore an object of the present invention to provide a new and improved bottle cap device that has all of the advantages of the prior art and none of the disadvantages.

It is another object of the present invention to provide a new and improved bottle cap device having a bottle cap housing and one or more rotatable dials that display letters, numbers, or symbols in order to help a user to identify his or her bottle or beverage container, or the contents thereof.

It is yet another object of the present invention to provide a new and improved bottle cap device with a bottle cap housing and one or more rotatable dials to display a unique visual indicator to identify the user or contents of a bottle.

It is yet another object of the present invention to provide a new and improved bottle cap device with a bottle cap housing and a lever to rotate one or more dials to display a unique visual indicator.

It is yet another object of the present invention to provide a new and improved bottle cap device with a bottle cap housing and a rotatable knob to rotate one or more dials to display a unique visual indicator to identify the user or contents of a bottle.

It is yet another object of the present invention to provide a new and improved bottle cap device having a locking mechanism to prevent a user from inadvertently changing a combination of letters, numbers, or symbols displayed on the bottle cap.

Yet another object of the present invention is to provide a new and improved bottle cap device adapted for use with various bottles or containers having a standard size valve.

Yet another object of the present invention is to provide a new and improved bottle cap device that allows the bottle cap to be marked without the use of a writing utensil or other tools used for marking.

A final object of the present invention is to provide a new and improved bottle cap device that is washable and reusable.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
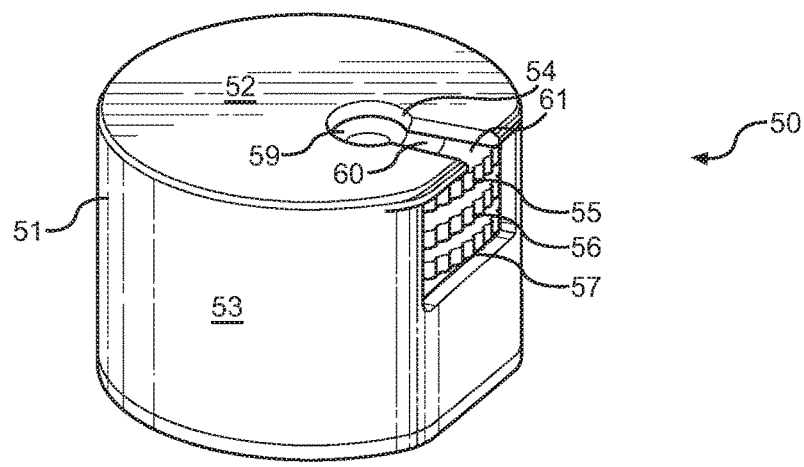
FIG. 1 is a perspective view of an embodiment of the present invention including three rotatable dials.

Reference is made herein to the attached drawings. Like reference numerals are used throughout the drawings to depict like or similar elements of the bottle cap. For the purposes of presenting a brief and clear description of the present invention, the preferred embodiment will be discussed as used for identifying the user or contents of a container when there are several containers similar in appearance. The figures are intended for representative purposes only and should not be considered to be limiting in any respect.

Figure 2:
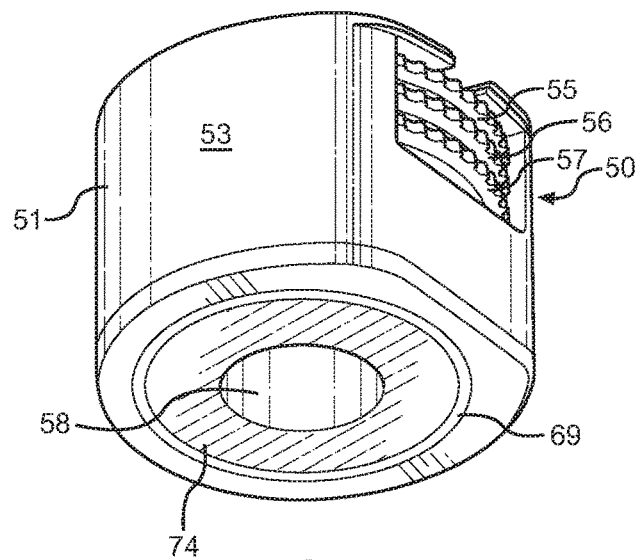
FIG. 2 is a bottom view of an embodiment of the present invention including three rotatable dials.

Referring now to FIGS. 1 and 2, there are shown perspective views of a reusable bottle cap 50 in accordance with at least one embodiment of the present invention. A cap housing 51, which secures the components of the bottle cap 50, is generally cylindrical in shape, although other shapes may be used. The cap housing 51 comprises a substantially closed upper 52, an open lower, a substantially closed lateral surface 53, and a hollow interior 58. The housing 51 may be formed of a single piece of rigid material, such as plastic.

In the illustrated embodiment of the present invention, the cap housing 51 encloses three rotatable dials 55, 56, 57, each rotatable dial having a visible surface 61, 60, 59, respectively. Each of the dials 55, 56, 57 are substantially round in shape and are composed of a rigid material, such as plastic. The dials 55, 56, 57 are mounted within the upper portion of the hollow interior 58. The dials include a plurality of characters thereon such as letters, numbers, symbols, and/or blank spaces. The characters are disposed around the visible surface 61, 60, 59, of the dials 55, 56, 57, respectively. In the illustrated embodiment, the visible surfaces 61, 60, 59 are configured so that a user can display a combination of two letters on the visible surfaces 61, 60 and a symbol on the visible surface 59. Each dial is individually rotatable and settable so that an individual or a set of characters may be selected. The dials 55, 56, 57 may be knurled around its perimeter edge, giving tactile feedback and providing more control to a user when rotating the dials 55, 56, 57.

The housing 51 of the illustrated embodiment further comprises a window cutout 54 in a modified L-shape. The window cutout 54 is positioned approximately from the center of the upper surface 52 to its perimeter edge, then extended downward to the middle of the lateral surface 53.

The window cutout 54 displays the visible surfaces of the dials. As such, the window cutout 54 is adapted to display one of the characters from each of the visible surface 61, 60, 59 of the rotatable dials atone time. The upper portion of the window cutout 54 disposed on the upper surface 52 of the housing 51 displays a combination of characters on the visible surfaces 61, 60, 59 of the dials 55, 56, 57, respectively. The lateral portion of the window cutout 54 allows a user to access the edges of the dials 55, 56, 57. When a desired combination of the characters are positioned in alignment with the window cutout 54, the combination of the characters serves as a visual indicator to the user in facilitating identification of his or her beverage bottle. The dials 55, 56, 57 remain in place until the user manipulates the dials at a later time to display a new combination of characters.

The lower portion of the hollow interior 58 of the bottom of the cap 50 includes a valve housing 69, which encases a valve closure 74. The lower portion of the hollow interior 58 is adapted to encase a valve on a bottle. In the present embodiment, the hollow interior 58 is adapted to encase a standard size valve on a beverage bottle. When in use, the valve is positioned in the hollow interior 58, and slid thereunder. The hollow interior 58 is configured so that the valve may be enclosed therein without interfering with the rotatable dials 55, 56, 57. The bottle cap 50 of the present invention provides a complete seal around the valve as to prevent debris or germs from coming into contact with the valve or the hollow interior 58.

Figure 3:
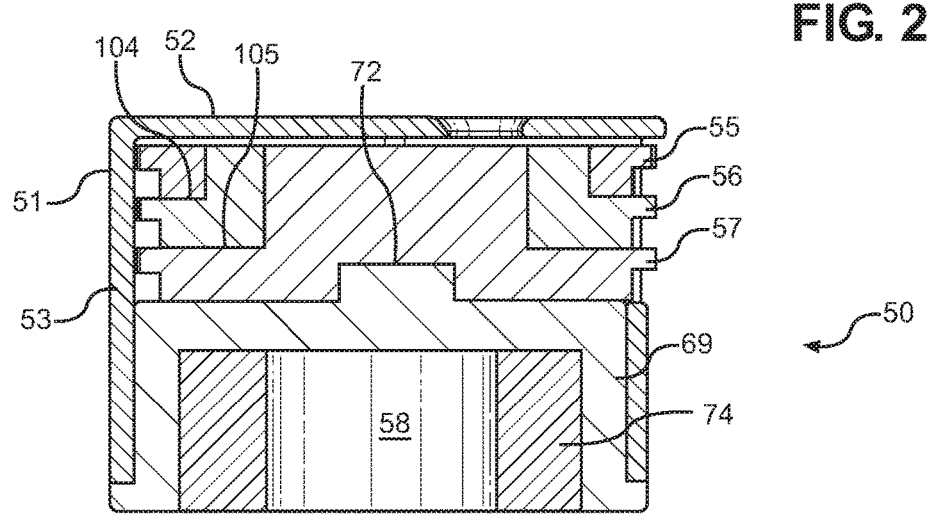
FIG. 3 is an orthogonal side view of an embodiment of the present invention including a cap housing, three rotatable dials, a valve housing, and a valve closure.

Referring now to FIG. 3, there is shown a side orthogonal view of an embodiment of the bottle cap 50. The housing 51 has a substantially closed upper 52 and an open lower. The dials 55, 56, 57 are axially aligned with each other, the cap housing 51, and a valve housing 69. The dial 55 is positioned above dial 56, which is positioned above dial 57. When the dials 55, 56, 57 are stacked on top of each other, the visible surfaces collectively form a substantially flat surface that is positioned flush adjacent to the upper surface 52 of the housing 51. Additionally, the edges of the dials 55, 56, 57 are adjacent to each other such that the edges form a substantially level, knurled surface.

The dial 55 is a substantially ring-shaped structure and includes a flat visible surface. The outer perimeter of the visible surface is substantially equal to the outer perimeter of its flat lower surface. The dial 56 is a modified bell shape with orthogonal sides and a hollow middle. The visible surface of the dial 56 protrudes upwards, creating a shoulder 104. The outer perimeter of the visible surface is substantially equal to the inner perimeter of the visible surface of the dial 55. As such, the outer perimeter of the visible surface of the dial 56 may slide into the inner perimeter of the visible surface of the dial 55. When the dials 55, 56 are properly positioned, the lower surface of the dial 55 rests on the shoulder 104 of the dial 56, and the visible surfaces of dials 55 and 56 form a substantially flat surface.

The dial 57 is also a modified bell shape with orthogonal sides. The visible surface of the dial 57 also protrudes upwards, creating a shoulder 105. The outer perimeter of the visible surface of the dial 57 is substantially equal to the inner perimeter of the visible surface of the dial 56. As such, the outer perimeter of the visible surface of the dial 57 may slide into the inner perimeter of the visible surface 60, and the lower surface of the dial 56 rests on the shoulder 105 of the dial 57. When the dials 55, 56, 57 are properly positioned, the visible surfaces of dials 55, 56, 57 are shown as concentric rings and form a substantially flat surface. The lower surface of the dial 57 further includes a round depression adapted to be mounted onto a protruding member 72 on top of a valve housing 69. The valve housing 69 supports the dials 55, 56, 57 from below to secure the dials 55, 56, 57 in the upper portion of the hollow interior 58 of the housing 51. The valve housing 69 also encloses a valve closure 74 thereunder. The valve closure 74 comprises a hollow interior adapted to fit a valve from a beverage bottle.

Figure 4:
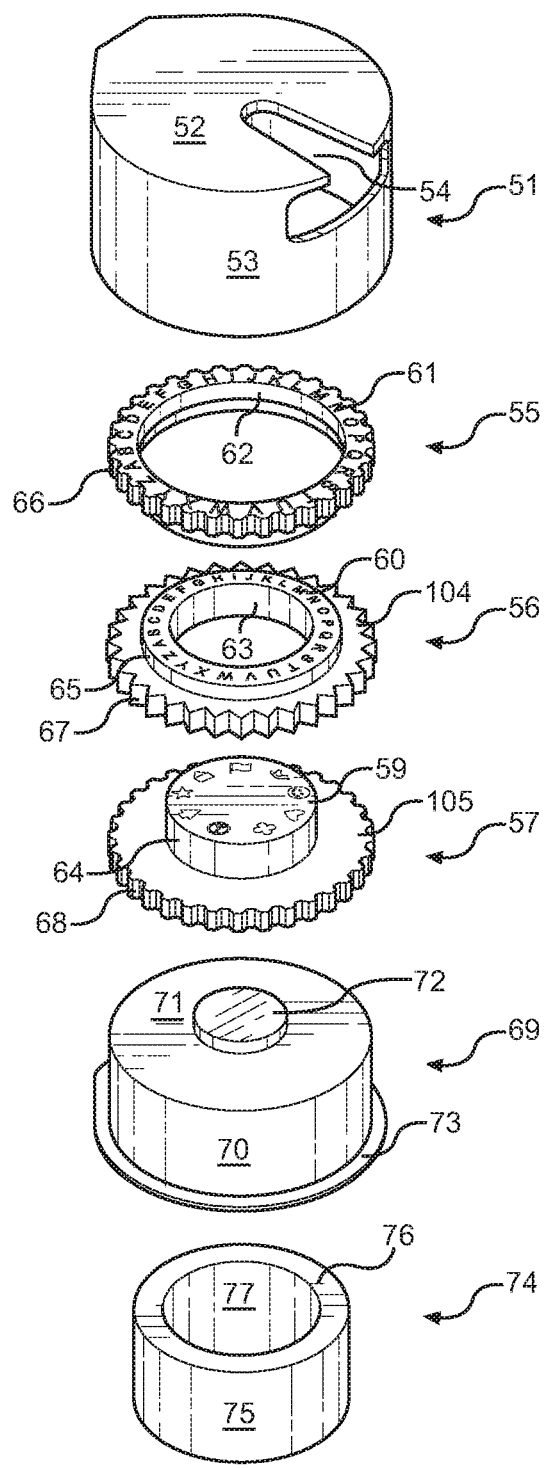
FIG. 4 is a perspective view of a cap housing, a top dial, a middle dial, a bottom dial, a valve housing, and a valve closure of an embodiment, constructed in accordance with the present invention.

FIG. 4 illustrates a view an embodiment of the bottle cap 50, constructed in accordance with the present invention. The assembly comprises six main elements that form the bottle cap 50, namely a cap housing 51, a plurality of rotatable dials 55, 56, 57, a valve housing 69, and a valve closure 74.

The dials 55, 56, 57 are axially aligned with each other and with the cap housing 51 and the valve housing 69. Each of the dials include a plurality of characters comprising letters, numbers, or symbols positioned around the circumference of the visible surface of the dial. The dials 55, 56 of the illustrated embodiment each have letters evenly spaced around the circumference of the visible surface 61, 62, respectively. The third dial 57 has symbols evenly spaced around the circumference of the visible surface 59. Other embodiments may have numbers or other symbols around the visible surface. Additionally, other embodiments may have greater or fewer characters around the visible surface. For example, larger dials are capable of displaying a greater number and combination of characters on the visible surface thereof.

The dials 55, 56, 57 are arranged so that the dial 57 is positioned below the dial 56, which is positioned below the dial 55. An inner perimeter 62 of the dial 55 fits around an outer perimeter 65 of the visible surface 60. An inner perimeter 63 of the dial 56 fits around an outer perimeter 64 of the dial 57. As such, when the dials 55, 56, 57 are stacked, visible surfaces 59, 60, and 61 form a substantially flat, contiguous visible surface. Additionally, an edge 66 of the dial 55, an edge 67 of the dial 56, and an edge 68 of the dial 57 are positioned flush against each other.

The lower surface of the dial 57 rests on an upper surface 71 of the valve housing 69 having a closed upper 71, open lower, and enclosed lateral surface 70. The valve housing 69 is substantially cylindrical in shape and comprises a rigid material, such as plastic or other suitable materials. A round protruding member 72 is adapted to fit into a depression on a lower surface of dial 57. The lateral surface 70 of the valve housing 69 fits tightly into the hollow interior 58 of the housing 51 so that the dials 55, 56, 57 are secured in place in the upper portion of the hollow interior 58 of the housing 51. The valve housing flange 73 located at the lower region of the valve housing 69 helps secure the valve housing 69 to the housing 51, as well as the bottle cap 50 of the present invention to a bottle or a container. The valve housing 69 further comprises a hollow interior, which is adapted to fit a valve closure 74 therein.

The valve closure 74 is tube-like in shape with an open upper and lower region, an exterior lateral surface 75, an interior lateral surface 77, and a perimeter edge 76. The valve closure 74 comprises a silicon or a rubber-like material that can create a seal around a valve on a beverage bottle. The outer surface 75 of the valve closure 74 fits tightly in the hollow interior of the valve housing 69. The valve closure 74 is adapted to fit around standard size valves of a conventional beverage bottle such that the valve would be enclosed in the valve closure 74 without touching the interior lateral surface 77 of the valve closure 74. When the bottle cap 50 is in use, the perimeter edge 76 creates a seal to prevent any debris from touching the valve or interior of the valve closure 74. To use the bottle cap 50 over the valve, the user would slide the bottle cap 50 on and off of the valve.

Figure 5:
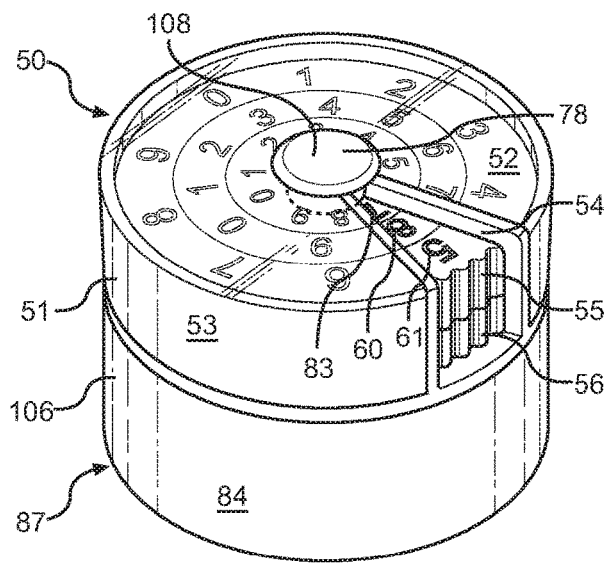
FIG. 5 shows a perspective view of a second embodiment of the present invention having two rotatable dials and one turning knob adapted to turn a third rotatable dial from the top of the device.
Figure 6:
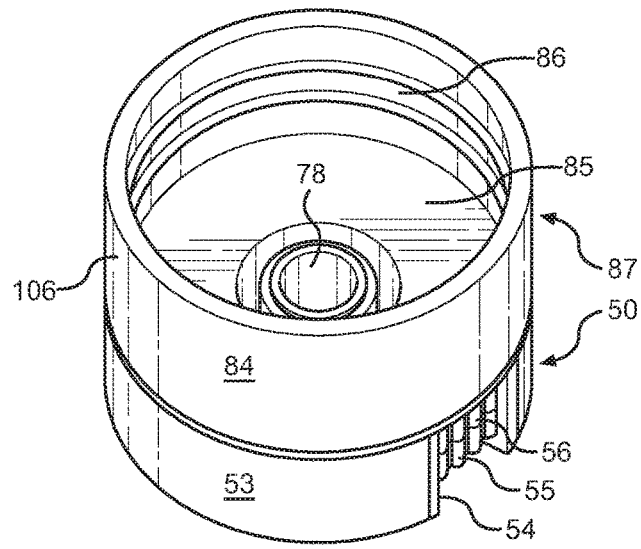
FIG. 6 shows a bottom view of a second embodiment of the present invention having two dials having a surface exposed on a side and having one turning knob adapted to turn a third rotatable dial from the top of the device.

Referring now to FIGS. 5 and 6, there are shown perspective views of a second embodiment of the present invention. The second embodiment of the present invention also includes a cap housing 51, which is generally cylindrical in shape with a substantially closed upper 52 and open lower, a substantially closed lateral surface 53, and a hollow interior. In the second embodiment of the present invention, the housing 51 encloses a rotating knob 78 and three rotatable dials 55, 56, 87, each having a visible surface 61, 60, 83, respectively. The rotating knob 78 is rod-like in shape, with a closed, rounded protruding top surface 108 and an open lower with a hollow interior.

Each of the dials 55, 56, 87 are substantially round in shape with a hollow middle adapted to receive the rotating knob 78 therethrough. The rotating knob 78 extends from the upper surface 52 of the housing 51 to the shoulder of the dial 87. The dials 55, 56, 87 are axially aligned with each other, the rotating knob 78, and the housing 51. The dials 55, 56, 87 are adapted to pivot around the rotating knob 78. The dials 55 and 56 are the same as disclosed previously in the first embodiment. Accordingly, when assembled, the lower surface of the dial 55 rests on the shoulder of the dial 56.

The dial 87 comprises a protruding visible surface 83, a shoulder, and a base member 106 further comprising a base lateral surface 84, a hollow interior 85, and a threaded interior lateral surface 86. The outer perimeter of the visible surface 83 is adapted to slide into the inner perimeter of the visible surface 60. When assembled, the lower surface of the dial 56 is placed on top of the shoulder on the dial 87. The dials 55, 56, and the visible surface 83 of the dial 87 are encased in the housing 51. When the dials 55, 56, 87 are positioned, the visible surfaces 61, 60, 83 form a substantially flat, contiguous surface. In the illustrated embodiment, the visible surfaces 61, 60, 83, are configured so that a user can display a combination of three numbers. Each dial is individually rotatable and settable so that an individual or a set of numbers may be selected. The dials 55, 56, may be knurled around its perimeter edge, giving tactile feedback and providing a better grip to the user when rotating the dials 55, 56.

The housing 51 of the illustrated embodiment further comprises a window cutout 54 in a wedge shape. The window cutout 54 is positioned approximately from the center of the upper surface 52 to its perimeter edge, then extended downward to the lower perimeter edge of the lateral surface 53. The window cutout 54 identifies to the user where to position the dials that have selected numbers. As such, the window cutout 54 is adapted to display one of the numbers from each of the dials 55, 56, 87 at one time. The upper portion of the window cutout 54 displays a combination of numbers on the visible surfaces 61, 60, 83 of the dials 55, 56, 87, respectively. The lateral portion of the window cutout 54 allows a user to access the knurled edges of the dials 55, 56. To rotate the innermost dial 87, the rotating knob 78 is utilized. When the proper combination of the numbers are positioned in alignment with the window cutout 54, the user can identify his or her beverage bottle. The dials 55, 56, 87, remain in place until a user manipulates the dials 55, 56 and the rotating knob 78 at a later time to display a new combination of numbers.

In the present embodiment, the housing 51 is vertically aligned with the base member of the dial 87 and press fitted to the perimeter edge of the shoulder 80. When the housing 51 is fitted onto the top portion of the dial 87, the lateral surface 53 of the housing and the base lateral surface 84 form a substantially flat, contiguous surface. The hollow interior 85 of the dial 87 is constructed to accept an opening of a beverage bottle without interfering with the rotatable dials 55, 56, 87 positioned thereabove. Furthermore, the threaded interior lateral surface 86 of the dial 87 is adapted to twist onto a threaded opening of a beverage bottle to securely close the bottle, preventing the contents of the bottle from spilling.

Figure 7:
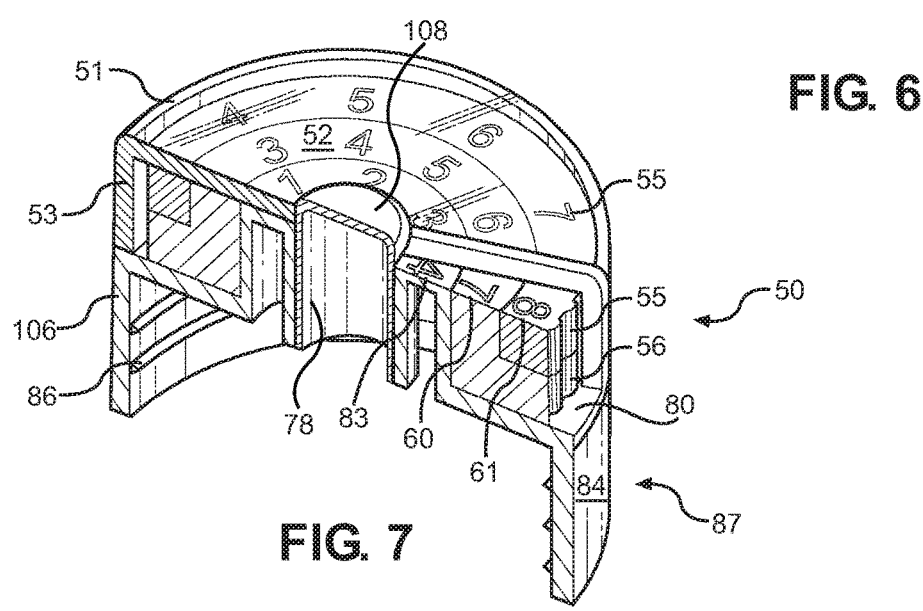
FIG. 7 shows a cross sectional perspective view of a second embodiment of the present invention having two rotatable dials on the side and one turning knob adapted to turn a third rotatable dial from the top of the device.

Referring now to FIG. 7, there is shown a cross sectional perspective view of a second embodiment of the present invention. The housing 51 has a substantially closed upper surface 52 and an open lower region. The dials 55, 56, 87, are axially aligned with each other, the housing 51, and a rotating knob 78. The rotating knob 78 extends from the upper surface 52 to the shoulder 80 of the dial 87. The housing 51 of this embodiment encases the dials 55, 56, and an upper portion of the dial 87 including the visible surface 83. The dial 55 is positioned above dial 56, which is positioned above dial 87. When the dials 55, 56, 87, are properly positioned, the visible surfaces 61, 60, 83 collectively form a substantially flat surface that is positioned flush adjacent to the upper surface 52 of the housing 51.

As disclosed in the first embodiment of the present invention, the dial 55 is a substantially ring-shaped structure adapted to fit onto the shoulder of the modified bell shaped dial 56. The dial 87 is also a modified bell shape with orthogonal sides and a hollow middle. The visible surface 83 of the dial 87 protrudes upward, creating a shoulder 80. The lower surface of the dial 56 rests on the shoulder 80 of the dial 87. The outer perimeter of the visible surface 83 is substantially equal to the inner perimeter of the visible surface 60 of the dial 56. The base member of the dial 87 has a smooth external lateral surface 84 and a hollow interior. The threaded interior lateral surface 86 of the base member 106 is adapted to twistedly fasten to a threaded opening of a bottle.

Figure 8:
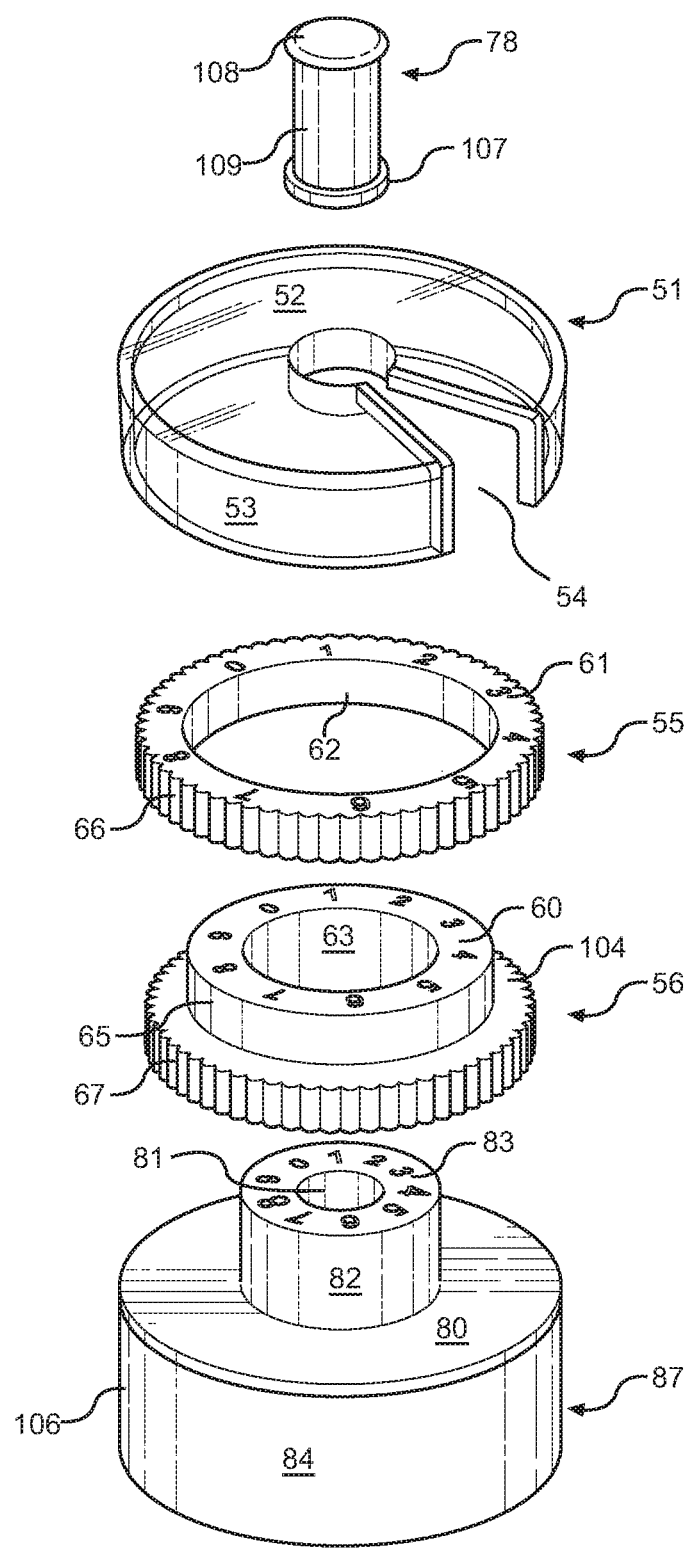
FIG. 8 shows a view of a turning knob, a cap housing, a top dial, a middle dial, and a bottom dial of the second embodiment, constructed in accordance with the present invention.

Referring now to FIG. 8, there is shown a view of a second embodiment of the bottle cap 50, constructed in accordance with the present invention. The assembly comprises five main elements that form the bottle cap 50, namely a rotating knob 78, a housing 51, and three dials 55, 56, and 87.

The dials 55, 56, 87, are axially aligned with one another and with the housing 51 and the rotating knob 78. The dials 55, 56, 87 of the illustrated embodiment each have numbers evenly spaced around the visible surface 61, 62, 83 respectively. Other embodiments may have letters or other symbols around the visible surface. The dials 55, 56, 87 are arranged such that the dial 87 is positioned below the dial 56, which is positioned below the dial 55. An inner perimeter 62 of the dial 55 fits around an outer perimeter 65 of the visible surface 60. The lower surface of dial 55 rests on the shoulder 104 of the dial 56. An inner perimeter 63 of the dial 56 fits around an outer perimeter surface 82 of the dial 87. The lower surface of dial 56 rests on the shoulder 80 of the dial 87. As such, when the dials 55, 56, 87 are stacked, visible surfaces 83, 60, and 61 form a substantially flat surface. Additionally, the edge 66 of the dial 55 is adjacent and substantially level to the edge 67 of the dial 56.

The dial 87 comprises a protruding visible surface 83, a shoulder 80, hollow middle 81, and a base member 106. The base member 106 further comprises a substantially closed upper and open lower, an external lateral surface 84. The circumference of the base member 106 is substantially equal to the circumference of the housing 51. When assembled, the lower perimeter edge of the housing 51 rests at the outermost edge of the shoulder 80. Accordingly, surface 53 of the housing 51 and surface 84 of the dial 87 collectively form a substantially flat, contiguous surface. The base member 106 further comprises an inner cavity adapted for covering an opening of a beverage bottle.

The rotating knob 78 is a modified cylindrical shaped structure having a closed upper 108, an open lower, and a hollow cavity therein. The open lower end of the rotating knob 78 includes a flange 107 that helps secure the knob 78 in place within the hollow middle of the dials 55, 56, 87. The closed upper end 108 of the rotating knob 78 has a dome-like shape adapted to allow a user to turn the knob 78 with a tip portion of finger. The circumference of the body 109 of the rotating knob 78 is substantially equal to the inner perimeter of the visible surface 83 so that the knob 78 fits tightly into the hollow middle 81. When in use, rotating the knob 78 simultaneously rotates the dial 87.

Figure 9:
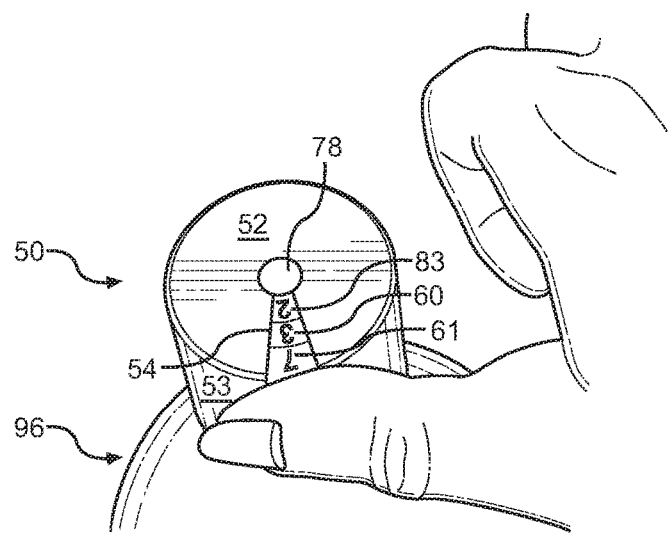
FIG. 9 shows a user turning the dials of the second embodiment of the present invention.

Referring now to FIG. 9, there is shown a perspective view of the second embodiment of the present invention in use as placed on a beverage bottle 96. The rotatable dials of the bottle cap 50 are manipulatable between locked and unlocked positions. The bottle cap 50 includes at least one dial for displaying a variety of characters configured to be shown through the top of the window cutout 54 disposed on the upper surface 52. In the illustrated embodiment, the characters on the visible surfaces 60, 61, 83 may be selected by turning the rotatable dials of the bottle cap 50.

To turn the dials a user would access the dial edges through the window cutout 54 disposed on the lateral surface 53. The user would then utilize his or her thumb or finger to push the edges of the dials through the side of the window cutout 54 in a clockwise direction. When a desired combination of characters have been selected on visible surfaces 61, 60, 83 the user can turn the dial one click in a counter-clockwise direction to temporarily lock the combination in place. Temporarily locking the combination in place prevents the user from inadvertently rotating the dial while using the device of the present invention. To turn the dial, the user would turn the knob 78 by applying slight pressure and simultaneously turning in a clockwise direction with a tip portion of the user's finger. Once the desired characters have been identified on visible surface 83, the arrangement of each character is determined so that one or more characters are displayed through the top portion of the window cutout 54. To reset the dials and set a new combination of characters, the user would turn the rotatable dials in a clockwise direction.

In yet other embodiments, the characters may be selected using other methods or processes, so as to provide a plurality of dials that can be arranged relative to each other so that the combination of various characters help the user identify his or her beverage bottle. Embodiments of the bottle cap 50 can also be configured to provide a textual combination that is easy for a user to remember. For example, a user may select a combination that provides two letters of their initials. The combination of letters, numbers, symbols, and/or blank spaces can help the user to remember the textual combination to identify his or her beverage bottle. Although some combinations of certain characters may be seemingly unrelated, each letter, number, symbol, and/or blank space may have individual significance to help the user remember and retain the combination to identify the bottle. Moreover, seemingly unrelated combination of characters provide reassurance against other users who may attempt to claim the beverage bottle. As a result, using one or more characters as the combination to identify the bottle can provide an easier way to identify his or her bottle.

Figure 10:
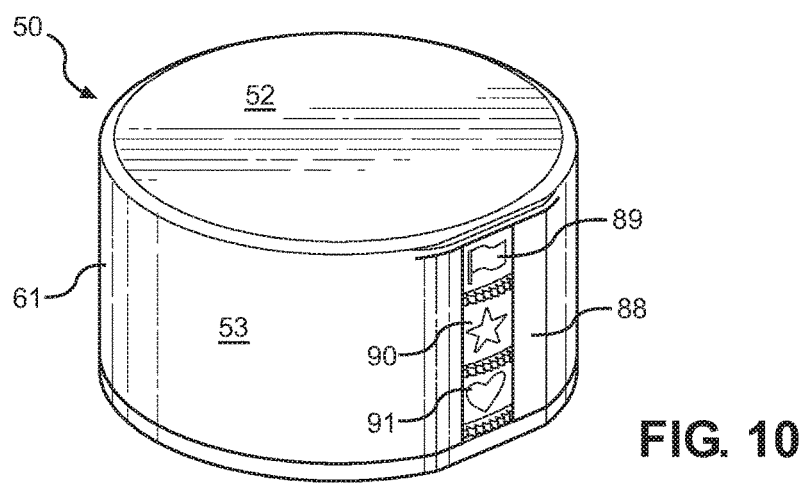
FIG. 10 shows a perspective view of a third embodiment of the present invention having three rotatable dials with an opening on the side of the cap housing through which the dials can be seen.

Referring now to FIG. 10, there is shown a perspective view of a third embodiment of the present invention. The third embodiment of the present invention includes a cylindrical housing 61 with a closed upper 52 and open lower, and a window cutout 88 disposed on the lateral surface 53 of the housing 61. The window cutout 88 is rectangular in shape and extends from the top edge of the housing 61 to the lower edge of the housing 61. The window cutout 88 identifies to a user where to position the dials that have selected characters. As such, the window cutout 88 is adapted to display one of the various characters disposed on the visible surfaces of each of the dials 89, 90, 91 at one time. Additionally, the window cutout 88 allows the user to access the dial edges to rotate the dials 89, 90, 91. When the proper combination of the characters are positioned in alignment with the window cutout 88, the user can identify his or her beverage bottle. The dials 89, 90, 91 remain in place until a user rotates the dials 89, 90, 91 to display a different combination of characters at a later time.

The housing 61 encases three rotatable dials, 89, 90, 91, each dial having smooth, visible lateral surfaces and knurled lower perimeter edges disposed thereunder. In the illustrated embodiment, the visible surfaces are configured so that the user can display a combination of three symbols. Each dial is individually rotatable and settable so that an individual or a set of symbols may be selected. The knurled perimeter edges give tactile feedback, which provide better control to the user when rotating the dials 89, 90, 91. Each of the dials 89, 90, 91 are axially aligned with each other and the housing 51. As such, each of the dials 89, 90, 91 rotates around its center point.

Figure 11:
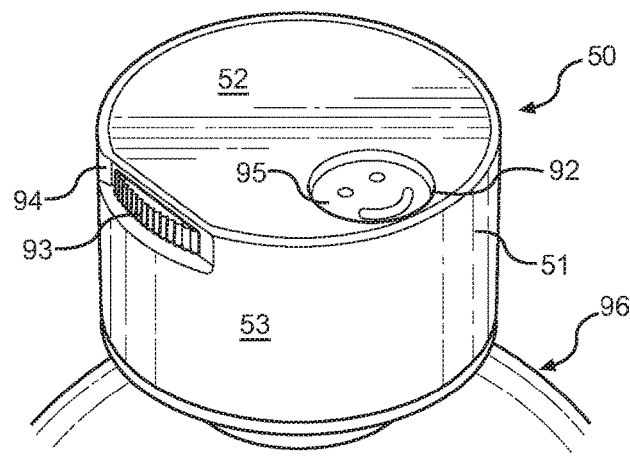
FIG. 11 shows a perspective view of a fourth embodiment of the present invention having one rotatable dial with a visible surface on the top of the device.

Referring now to FIG. 11, there is shown a perspective view of a fourth embodiment of the present invention. The fourth embodiment of the present invention includes a cylindrical housing 51 having a substantially closed upper 52 and open lower, and window cutouts 92, 94. The housing 51 encases one rotatable dial 93 having a visible surface 95 and a knurled perimeter edge. The window cutout 92 is disposed near the edge of the upper surface 52. The window cutout 92 identifies to a user where to position the dial 93 having selected characters disposed on the visible surface 95. The window cutout 92 is adapted to display one of the characters disposed on visible surface 95 of the dial 93 at one time. In the illustrated embodiment, the window cutout 92 is round, but it may be constructed in various shapes to display one of the characters disposed on visible surface 95.

A second window cutout 94 is disposed on the edge formed between the upper surface 52 and the lateral surface 53. The window cutout 94 allows a user to access the dial edge of the dial 93 to rotate the dial 93. The knurled perimeter edge gives a tactile feedback, which allows a user to grip the dial edge when rotating the dial 93. The dial 93 is axially aligned with each other and the housing 51. As such, the dial 93 rotates around its center point. When a proper symbol is are positioned in alignment with the window cutout 92, the symbol indicates the identity of the user of the beverage bottle 96 or its content.

Figure 12:
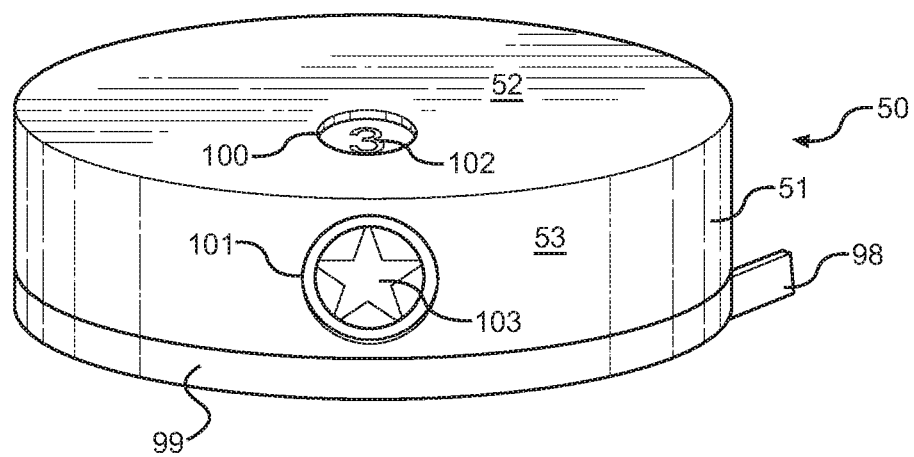
FIG. 12 shows a perspective view of a fifth embodiment of the present invention having a cap dial and a lever.

Referring now to FIG. 12, there is shown a frontal perspective view of a fifth embodiment of the present invention. The fifth embodiment of the present invention includes a housing 51 having a substantially closed upper 52, an open lower, substantially closed lateral surface 53, and window cutouts 100, 101. The window cutout 100 is disposed near the edge of the closed upper surface 52. The window cutout 100 identifies to a user where to position a dial featuring selected characters. The window cutout 100 is adapted to display one of the numbers disposed on a visible surface 102 of a rotatable dial at one time. The window cutout 101 is disposed on the lateral surface 53 of the housing 51. The window cutout 101 identifies to the user where to position a second rotatable dial with a visible surface 103. The window cutout 101 is also adapted to display one of the symbols disposed on the visible surface 103 of the dial at one time. In the illustrated embodiment, the window cutouts 100, 101 are round, but it may be constructed in various shapes to display one of the characters disposed on visible surface 102, 103.

In the illustrated embodiment, the housing 51 encases two rotatable dials. One rotatable dial includes the visible surface 102. To select one of the numbers disposed on the visible surface 102, the user rotates the housing 51 in a clockwise direction until the desired number is displayed through the windowcutout 100. The second rotatable dial includes a lateral visible surface 103, a flange 99, and a lever 98 attached thereto. The lever 98 is adapted to move along the perimeter of the lower end of the housing 51. When the lever 98 is moved along the perimeter of the housing 51, the second rotatable dial is rotated simultaneously, allowing the user to select one of the symbols disposed on the lateral visible surface 103 and position the desired symbol in alignment with the window cutout 101. The flange 99 is constructed to secure the housing 51 in place. When the desired characters are positioned in alignment with the window cutouts 100, 101, the user can identify his or her beverage bottle.

Figure 13:
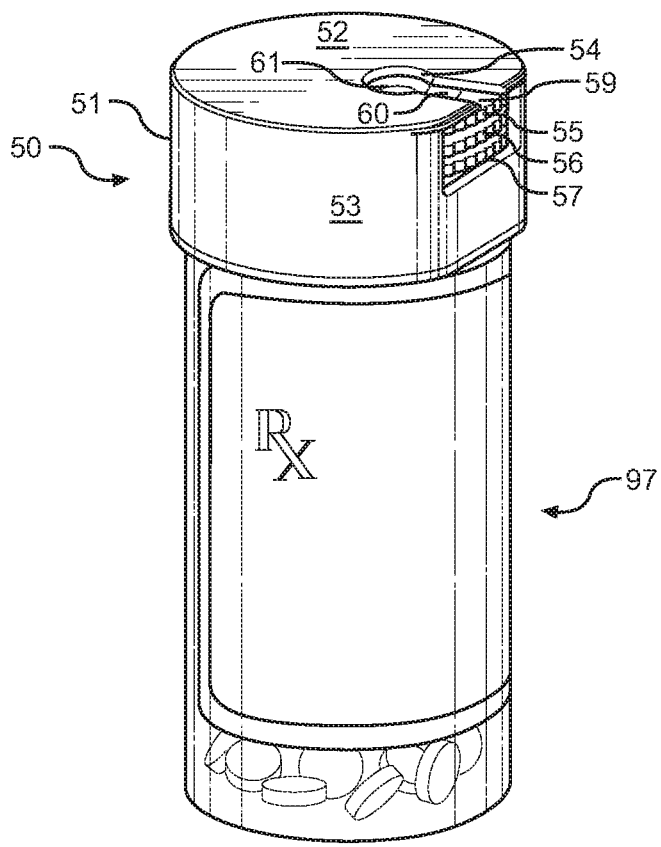
FIG. 13 shows a perspective view of an embodiment of the present invention as used for a prescription pill bottle.

Referring now to FIG. 13, there is shown a perspective view of an embodiment of the present invention as used for a prescription pill bottle 97. In this embodiment, the housing 51 encloses three dials, 55, 56, 57, having visible surfaces 61, 60, 69, respectively. The visible surfaces 61, 60, 59 comprise a variety of characters comprising letters, symbols, and/or numbers. In the illustrated embodiment, a manufacturer may select a combination of characters, wherein at least one of the characters is specifically targeted to a medical information. For example, the bottle cap 50 can be custom configured such that one or more of the characters include requested medical information for a particular patient. Additionally, a pharmaceutical company may order custom bottle caps 50 adapted to display a combination of medical symbols suitable for indicating contents and proper usage of the particular medication contained in a pill bottle.

Figure 14:
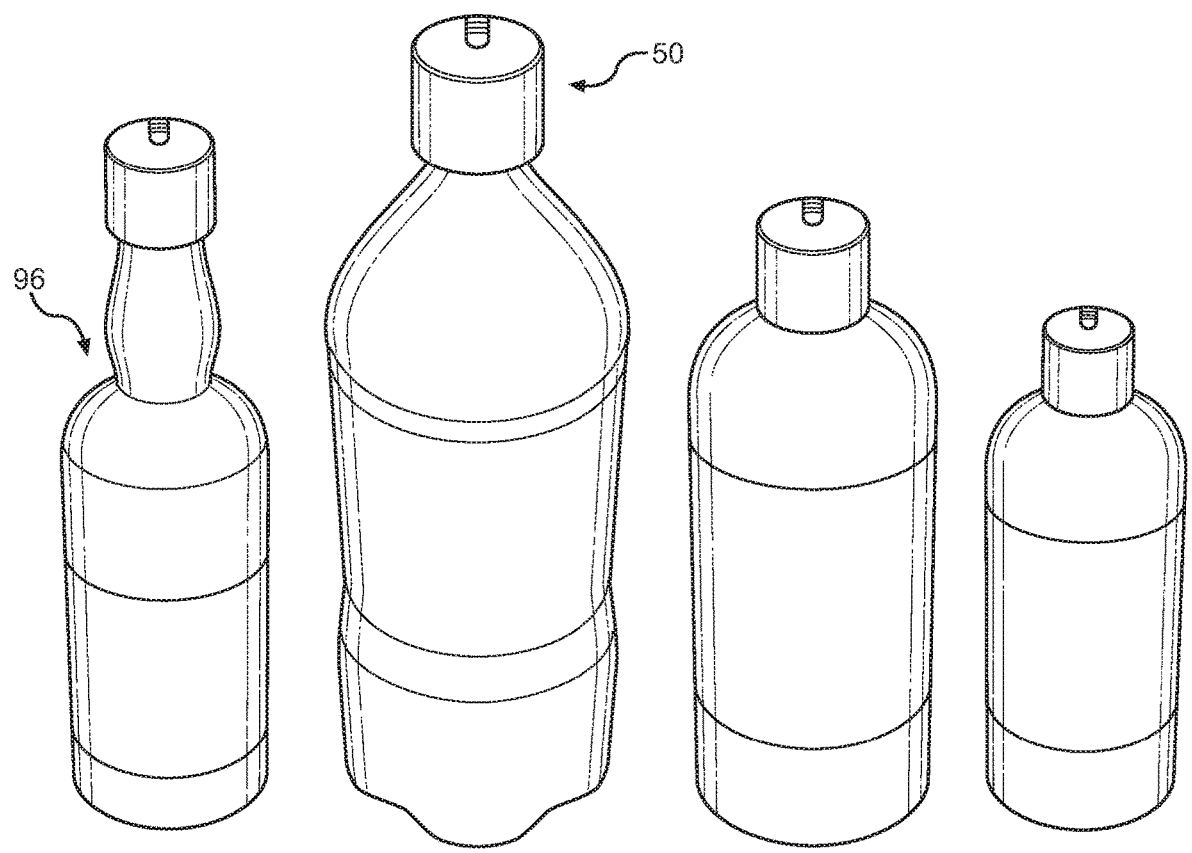
FIG. 14 shows a view of an embodiment of the present invention as used for a variety of bottles.

Referring now to FIG. 14, there is shown a view of the present invention as used for a variety of beverage bottles 96. The bottle cap 50 of the present invention includes a hollow cavity adapted to receive a standard size opening or a valve of a beverage bottle. The hollow cavity of the bottle cap 50 may be adapted to fit onto a threaded opening for a twist opening or closure. Additionally, the hollow cavity of the bottle cap 50 may be adapted to slide on or off of a standard size valve. The bottle cap 50 is suitable for repeated use, and can be washed after each use.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A reusable bottle cap device comprising:
   a housing having an entirely closed upper surface, an open lower region, a substantially closed lateral surface, a hollow inner cavity, and at least one window cutout formed in the substantially closed lateral surface;
   at least one rotatable dial having a visible surface on which a plurality of numbers, characters, or symbols are displayed and can be seen through said at least one window cutout;
   said at least one rotatable dial further comprising an edge that can be accessed by a user via said at least one window cutout such that a user can rotate said at least one rotatable dial;
   a valve housing affixed to said open lower region of said housing at an upper side of the valve housing and adapted to secure to an opening on a beverage container at a lower side thereof;
   wherein the at least one rotatable dial is positioned within the housing and is seated on the upper side of the valve housing wherein the at least one rotatable dial encircles a lateral sidewall of the value housing and is adapted to rotate thereabout, the lateral sidewall extending from the upper side towards the housing;
   wherein rotation of the at least one rotatable dial is isolated and independent from the lower side of the valve housing, such that securement of the value housing to the beverage container is unrelated to the rotation of the at least one rotatable dial;
   wherein the entirely closed upper surface extends continuously along any diameter thereof, wherein the diameter extends across a perimeter of the closed upper surface.

2. The reusable bottle cap of claim 1, wherein said at least one rotatable dial further comprises:
   a first rotatable dial comprising substantially a ring shape, a visible surface having an inner and outer perimeter, a hollow middle, and said plurality of numbers, characters, or symbols disposed near said visible surface outer perimeter, wherein said visible surface outer perimeter is the edge;
   a second rotatable dial comprising a modified bell shape, a raised visible surface having an inner and outer perimeter, a hollow middle, said plurality of numbers, characters, or symbols disposed near said visible surface outer perimeter, the edge disposed near a lower region of said second rotatable dial; and
   a third rotatable dial comprising a modified bell shape, a raised visible surface having an inner and outer perimeter, a plurality of numbers, characters, or symbols disposed near said visible surface outer perimeter, the edge disposed near a lower region of said third rotatable dial, and a lower surface having a central indentation;
   wherein said first, second and third rotatable dialed are in a stacked orientation;
   a valve closure, wherein said valve housing comprises closed upper surface having a protrusion adapted to fit under at least one rotatable dial, an open lower region, and a hollow inner cavity therein adapted to receive said valve closure;

said valve closure having an open upper and lower region, said valve closure adapted to receive a valve of a bottle.

3. The reusable bottle cap of claim 1, wherein said at least one rotatable dial further comprises:

a first rotatable dial having a ring shape;

wherein said visible surface thereof has an inner perimeter and an outer perimeter, a hollow middle;

wherein said plurality of numbers, characters, or symbols are near said outer perimeter of said visible surface;

wherein said visible surface outer perimeter is a dial edge.

4. The reusable bottle cap of claim 1, wherein said at least one rotatable dial further comprises:

a second rotatable dial comprising a modified bell shape, a raised visible surface having an inner and outer perimeter, a hollow middle;

said plurality of numbers, characters, or symbols disposed near said visible surface outer perimeter;

a dial edge disposed near a lower region of said second rotatable dial.

5. The reusable bottle cap of claim 4, wherein said at least one rotatable dial further comprises:

a third rotatable dial comprising a modified bell shape, a raised visible surface having an inner and outer perimeter;

said plurality of numbers, characters, or symbols disposed near said visible surface outer perimeter;

a dial edge disposed near a lower region of said third rotatable dial; a lower surface having a central indentation.

6. The reusable bottle cap of claim 1, wherein said at least one rotatable dial further comprises:

a first rotatable dial comprising substantially a ring shape, a visible surface having an inner and outer perimeter, a hollow middle, and said plurality of numbers, characters, or symbols disposed near said visible surface outer perimeter, wherein said visible surface outer perimeter is a dial edge;

a second rotatable dial comprising a modified bell shape, a raised visible surface having an inner and outer perimeter, a hollow middle, said plurality of numbers, characters, or symbols disposed near said visible surface outer perimeter, and a dial edge disposed near a lower region of said second rotatable dial; and a third rotatable dial comprising a modified bell shape, a raised visible surface having an inner and outer perimeter, a plurality of numbers, characters, or symbols disposed near said visible surface outer perimeter, a dial edge disposed near a lower region of said third rotatable dial, and a lower surface having a central indentation;

wherein said first, second and third rotatable dialed are in a stacked orientation.

7. The reusable bottle cap of claim 1, wherein the valve housing is configured to seal the opening of the beverage container, when secured thereto, in all configurations of the at least one rotatable dial.

8. The reusable bottle cap of claim 1, wherein the closed upper surface prevents solids or liquids from passing therethrough.

9. The reusable bottle cap of claim 1, wherein the perimeter of the closed upper surface is entirely disposed on a single horizontal plane.

10. The reusable bottle cap of claim 1, wherein the at least one rotatable dial comprises a first dial that rests directly upon a second dial in a stacked configuration.

11. The reusable bottle cap of claim 1, wherein the valve housing comprises an annular shoulder extending from the lateral sidewall, the annular shoulder forming an exterior of the reusable bottle cap device.

12. The reusable bottle cap of claim 11, wherein the annular shoulder forms a lowermost edge of the reusable bottle cap device.

13. The reusable bottle cap of claim 11, wherein the housing is seated upon the annular shoulder of the valve housing.

* * * * *